United States Patent [19]

Hinkel et al.

[11] Patent Number: 4,813,467
[45] Date of Patent: Mar. 21, 1989

[54] RADIAL PLY AIRCRAFT TIRE AND RIM

[75] Inventors: Walter W. Hinkel, Massillon; Jolan F. Lobb, North Canton; Gene D. Wall, Akron; Roger J. Forand; Gerald B. Gehringer, both of Stow, all of Ohio

[73] Assignee: The Goodyear Tire & Rubber Company, Akron, Ohio

[21] Appl. No.: 164,702

[22] Filed: Mar. 7, 1988

Related U.S. Application Data

[63] Continuation-in-part of Ser. No. 931,459, Nov. 5, 1986, abandoned.

[51] Int. Cl.$^4$ .............................................. B60C 3/04
[52] U.S. Cl. .................................. 152/454; 152/375; 152/548
[58] Field of Search .............. 152/454, 548, 379.3, 152/380, 375

[56] References Cited

U.S. PATENT DOCUMENTS 3,757,844  9/1973  Verdier .
4,258,773  3/1981  De Saint-Michel ................ 152/454
4,345,634  8/1982  Giron .................................. 152/454

FOREIGN PATENT DOCUMENTS 0063732  11/1982  European Pat. Off. ........... 152/454
2033311  5/1980  United Kingdom .

OTHER PUBLICATIONS

1986 Yearbook of the Tire and Rim Association, Inc., pp. 9-08.
Aircraft Engineering Design Information, The Tire and Rim Association, 10-31-1985, 7/22/1986; pp. AC-30-B and AC-31-C.

Primary Examiner—Michael W. Ball
Assistant Examiner—Geoffrey L. Knable
Attorney, Agent, or Firm—L. R. Drayer

[57] ABSTRACT

A radial ply aircraft tire (11) is mounted upon an H-type rim (10) which was originally designated for use with a bias ply aircraft tire. The ratio of the axial distance (WBF) between the rim flanges to the maximum cross-sectional width (CSWR) of the tire is in the range of 0.7 to 0.9. The ratio of footprint width to footprint length for the tire is in the range of 0.45 to 0.65. Preferably, the carcass (12) and the belts (14) are reinforced with aramid cords. A line (T) which is tangent to a carcass ply (12) and passes through the center of a bead (13) is inclined at an angle ($\alpha$) of greater than 60° with respect to the tire's axis of rotation.

7 Claims, 6 Drawing Sheets

RADIAL PLY AIRCRAFT TIRE AND RIM

This application is a Continuation-in-part of application Ser. No. 931,459 filed on Nov. 5, 1986, now abandoned.

This invention relates generally to tire and rim combinations, and more specifically to a radial ply aircraft tire mounted upon an H-type rim as defined by The Tire and Rim Association, Incorporated.

The dimensions of tires and rims used on aircraft are specified by The Tire and Rim Association, Incorporated, which is located at 3200 West Market St., Akron, Ohio, U.S.A., 44313. In fact, it is the customary practice in the aircraft tire and rim industries to specify the rim that a tire is to be mounted upon. For example, at page 9-08 of the 1986 YEAR BOOK of The Tire and Rim Association, Incorporated a bias ply aircraft tire of size H44.5×16.5-20 is specified as having a maximum outside diameter of 44.50 inches and a cross-sectional width in the range of 15.70 to 16.50 inches and is to be mounted upon an H44.5×16.5-20 rim having an axial width between its flanges of 10.50 inches. The letter H in the size designation of an aircraft tire is used in the tire industry to indicate that a tire is to be mounted upon an H-type rim, and of course the letter H in the rim description means that it is an H-type rim. It is the customary practice in the aircraft tire and rim industries, as exemplified by the aircraft tire and rim specifications on page 9-08 of said 1986 YEAR BOOK, that the ratio of the width between the flanges of the rim to the cross-sectional width of the tire is in the range of about 0.55 to 0.65 for bias ply tires.

The current interest in the aircraft tire industry in developing commercially viable radial ply tires for aircraft has made a radial ply aircraft tire that is useable with the existing H-type rims very desirable. As used herein and in the claims, an "H-type rim" is understood to mean a rim that meets the criteria for an H-type rim as set forth on pages AC-30-B (dated 10/31/85 and revised 7/22/86) and AC-31-C (dated 10/31/85) of AIRCRAFT ENGINEERING DESIGN INFORMATION published by The Tire and Rim Association, Incorporated, which is incorporated herein by reference for the purpose of defining an H-type rim. As a matter of practicality it should be pointed out that all, or nearly all, H-type rims will have their size permanently indicated thereon with the letter H included in the size designation.

If a radial ply tire has dimensions such that the ratio of cross-sectional width to the axial distance between the rim flanges of an H-type rim is in the specified range of 0.55 to 0.65 for bias ply tires, the radial ply tire will not perform as well as a tire according to the present invention. It is believed that the performance of the new tire is attributable at least in part to the length of the reinforcing cords of the carcass ply being shorter in length and the lower sidewall portions of the tire not resting upon the rim flanges.

When a radial ply tire was designed and manufactured to the current bias ply tire dimensions (in this instance having ratios of width between flanges to tire section width of 0.65 and 0.68 and having a carcass ply and belts reinforced by an aramid material), the tires failed catastrophically during developmental testing (catastrophic failure is defined as a blowout). This testing consisted of dynamic wheel tests with varying loads and speeds to determine the tire's capabilities. During this testing, the radial ply tires exhibited extensive wave behavior that led to premature failure.

This failure was attributed to the cord length of the carcass which allowed standing waves to be set up in the tire sidewalls, and the tendency to imitate bias ply tire behavior by pressing against the wheel flange.

A similarly constructed radial ply tire to the dimensions of the tire disclosed herein (in this instance having ratios of width between flanges to tire section width of 0.74 and 0.80), demonstrated comparable load carrying capabilities to those of the wider section width tire (keeping the maximum outside diameter of the various tires constant).

During testing to meet aircraft manufacturers' specifications, the radial ply tire disclosed herein did not exhibit the type of wave behavior characteristic of the wider section width tire.

Problems encountered during the development of the new tires were of different types that did not result in catastrophic failures.

The features of the present invention which are believed to be novel are set forth with particularity in the appended claims. The present invention, both as to its structure and manner of operation, may best be understood by referring to the following detailed description, taken in accordance with the accompanying drawings in which:

Figure 1:
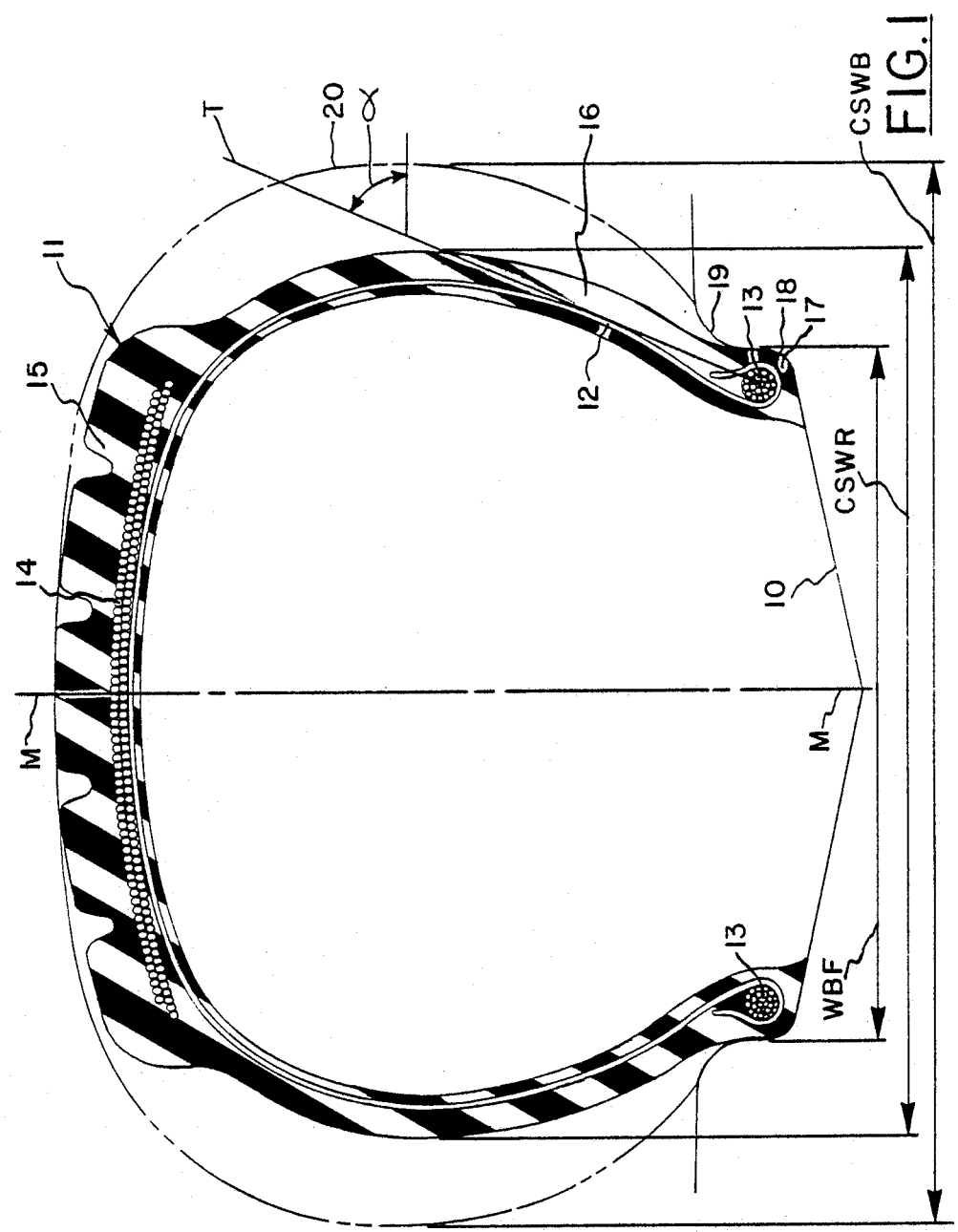
FIG. 1 is a cross-sectional view of a tire according to the invention mounted upon an H-type rim.

Referring first to FIG. 1, line 10 indicates the radially outer profile of an H-type rim of size H44.5×16.5-20 as defined by the Tire and Rim Association, Inc. A radial ply aircraft tire 11 of size H44.5×16.5R20 is shown in cross-section mounted upon the H-type rim. As used herein and in the appended claims an "aircraft tire" is understood to mean a tire of a size designated for use on aircraft by a tire manufacturer and/or the Tire and Rim Association, Inc.

The radial ply aircraft tire 11 has at least one carcass ply 12 of reinforcing fabric comprising cords that intersect the mid-circumferential plane M—M of the tire at angles in the range of 90° to 75°. It is preferred, but not known to be essential, that the reinforcing cords in the carcass ply 12 be comprised of an aramid material. As used herein and in the appended claims, an "aramid material" is understood to mean a manufactured fiber in which the fiber-forming substance is generally recognized as a long chain synthetic aromatic polyamide in which at least 85% of the amide linkages are attached directly to two aromatic rings. Representative of an aramid material is a poly(p-phenyleneterephthalamide). The carcass reinforcing ply 12, or plies, are anchored around a pair of substantially inextensible annular beads 13. While the beads illustrated in FIG. 1 have a cross-sectional shape that is round, it is understood that a tire designer could employ beads having any cross-sectional shape in accordance with good engineering practices. The axial distance between the axially outermost extent of the beads 13 is substantially the same as the axial distance WBF between the flanges of the rim. A belt package 14, comprised of one or more belt plies of the type known in the tire art, is disposed radially outwardly of the carcass ply in the crown portion of the tire. It is preferred, but not known to be essential, that the reinforcing cords in the belts be of an aramid material. It is believed that the belts in the belt package may be either unfolded, folded or a combination of the two at the discretion of a tire designer. A tread portion 15 is disposed radially outwardly of the belt package 14. A sidewall portion 16 extends radially inwardly from each lateral edge of the tread portion to a bead portion 17 of the tire.

A tire according to the invention has a maximum cross-sectional width CSWR when it is mounted upon the designated H-type rim, and is inflated to its rated inflation pressure as specified by the tire manufacturer, but not subjected to any load. The ratio of the axial distance WBF between the rim flanges of the H-type rim to the maximum cross-sectional width CSWR of the tire is in the range of 0.7 to 0.9 (more preferably 0.75 to 0.85, and most preferably 0.78 to 0.82) its specified inflation pressure as designated by the tire manufacturer, but not subjected to any load. As used herein, the width between flanges WBF of an H-type rim, is understood to be the axial distance between the tangency points of the bead heel 18 and flange 19 curves of the rim.

A line T which is tangent to the carcass ply 12 and passes through the center of a bead 13 is inclined at an angle α with respect to the tire's axis of rotation. As illustrated in FIG. 1, in a tire according to the invention the angle α is greater than 60°.

Dashed line 20 of FIG. 1 represents the outside contour of an H44.5×16.5-20 bias ply tire of the type specified for use with the H-type rim illustrated. The maximum cross-sectional width of the prior art bias tire is indicated in FIG. 1 as CSWB. It is believed that if a radial ply tire were to have the same outside profile as the prior art bias ply tire the radial ply tire would be unstable because the length of the reinforcing cords in the tire sidewall would be too great, and the tire would be resting against the rim flange.

Figure 2:
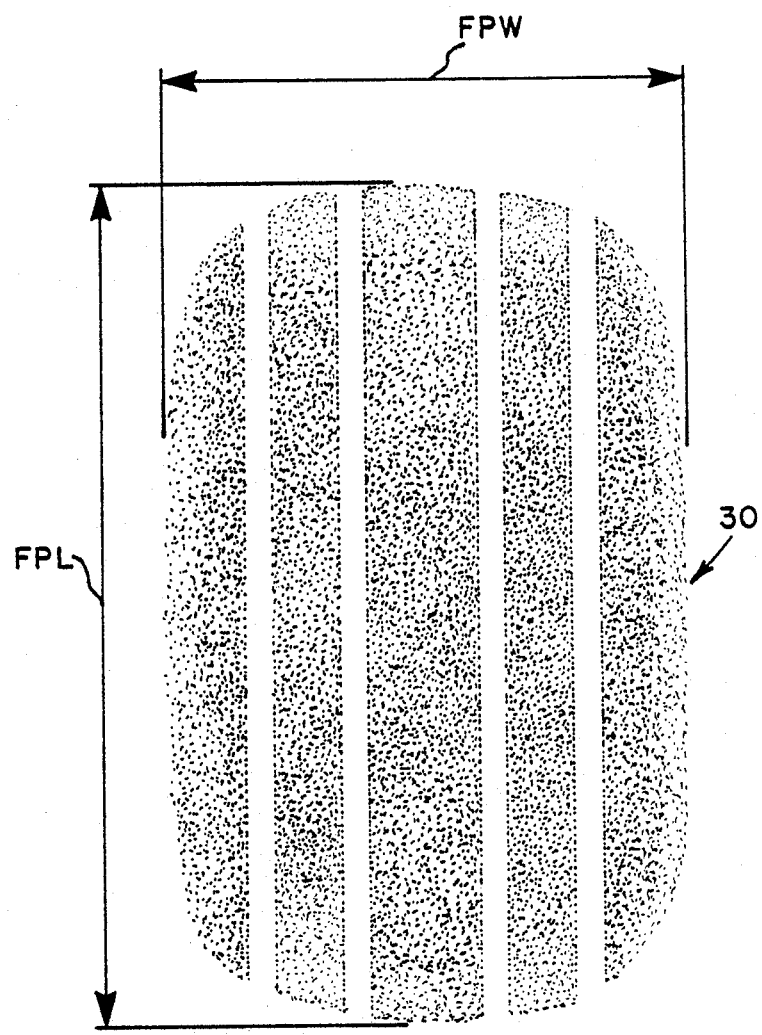
FIG. 2 is a footprint of a tire according to the invention.

Referring next to FIG. 2, there is shown by way of example only what is believed to be the desirable footprint 30 of a radial ply aircraft tire. In the desirable footprint the footprint width FPW and the footprint length FPL are such that the ratio of FPW over FPL is in the range of 0.45 to 0.65, preferably 0.5 to 0.6. A tire used in a tire and rim combination according to the invention not only accommodates the desired ratio of width between flanges of the rim to cross-sectional width of the tire, but also has a static footprint such that the ratio of the maximum axial width of the footprint to the maximum axial length of the footprint is in the range of 0.45 to 0.65 when the tire and rim combination is subjected to the rated load for the inflation pressure designated by the tire manufacturer.

It is customary in the aircraft industry for the manufacturer of an aircraft to specify the size and type of tire and rim to be used on an aircraft. If a tire designer knows the tire size from the aircraft manufacturer's specification, or the standards issued by the Tire and Rim Association, Inc., the designer should know certain design parameters, such as the maximum outside diameter of the tire, the diameter of the rim, and the strength requirements for the tire. A method that a tire designer may follow in order to define the outside molded profile of a tire to be used in making a tire and rim combination according to the invention is illustrated in FIGS. 3–9. In order to use this procedure, a tire designer needs to have:

a. a drawing of the radially outer contour of the rim that the tire is intended to be mounted upon:

b. the dimensions and location of the annular bead cores:

c. the maximum outside diameter of the tire in its inflated condition: and d. the maximum cross-sectional width of the tire in its inflated condition.

As used herein the "molded profile" of a tire is the contour of the interior surface of a vulcanizing mold in which the tire will be vulcanized. It is understood that a tire designer or a mold designer of ordinary skill in his profession is proficient at converting the desired inflated dimensions of a tire to the dimensions at which the tire should be molded.

The steps of the following design procedure may be followed using hand calculators, computers, a computerized graphics generator (e.g. Computer Aided Design) to carry out these steps. Preferably, the drawings used in the following procedure are made full scale for the portion of the tire on one side of its centerplane.

Figure 3:
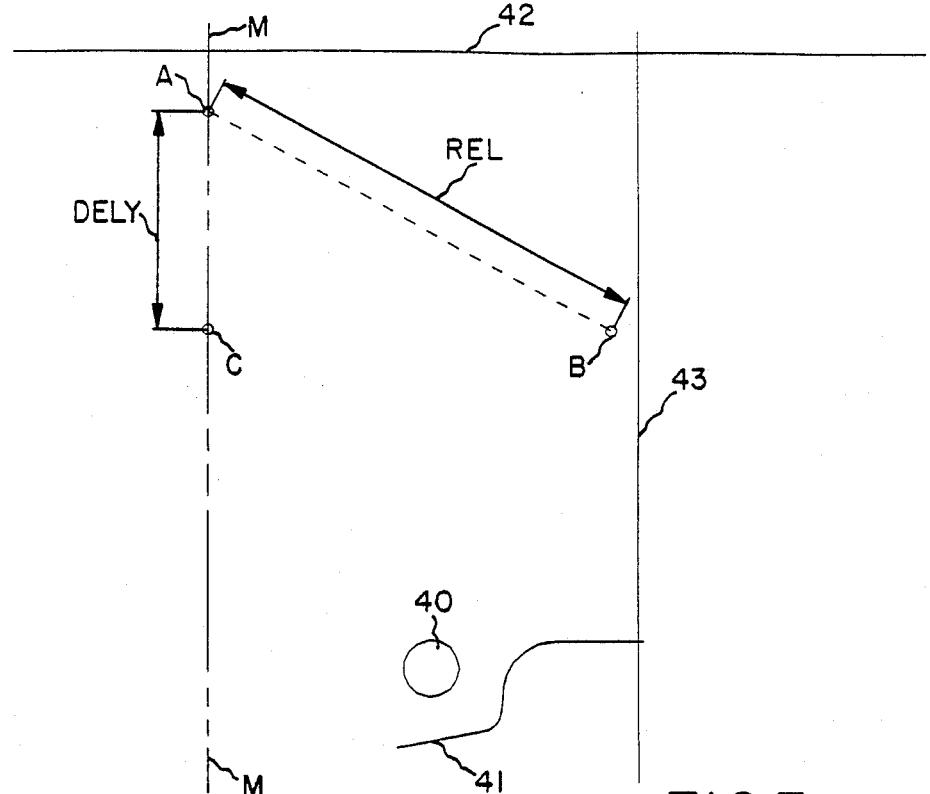
FIGS. 3-9 illustrate the steps followed in defining the profile of a tire according to the invention.

(a) With reference to FIG. 3, draw the bead core 40 in the correct position (allowing for rubber, plies, chafers, etc.) with respect to the radially outer profile 41 of an H-type rim.

(b) Draw a line 42 parallel to the axis of rotation of the tire and rim combination, spaced at the maximum molded outside diameter of the tire and draw another line 43 parallel to the centerplane M—M and located at the maximum molded width of the outside surface of the tire.

(c) Locate point A on the centerplane M—M of the tire located radially inwardly from line 42 a distance equal to the thickness of the tread rubber and belt package, that is to say point A is located at the top of the radially outermost carcass ply.

(d) Locate point B one-half of the radial distance between the radially outermost extent of the bead core 40 and point A and disposed axially inwardly from line 43 a distance equal to the desired thickness of the sidewall rubber (that is to say, the rubber disposed axially outwardly of the axially outermost carcass ply).

(e) Locate point C on the centerplane M—M at the same distance from line 42 as point B (put another way, ABC is a right triangle).

(f) Measure the distance REL between points A and B, and measure the distance DELY between points A and C.

Figure 4:
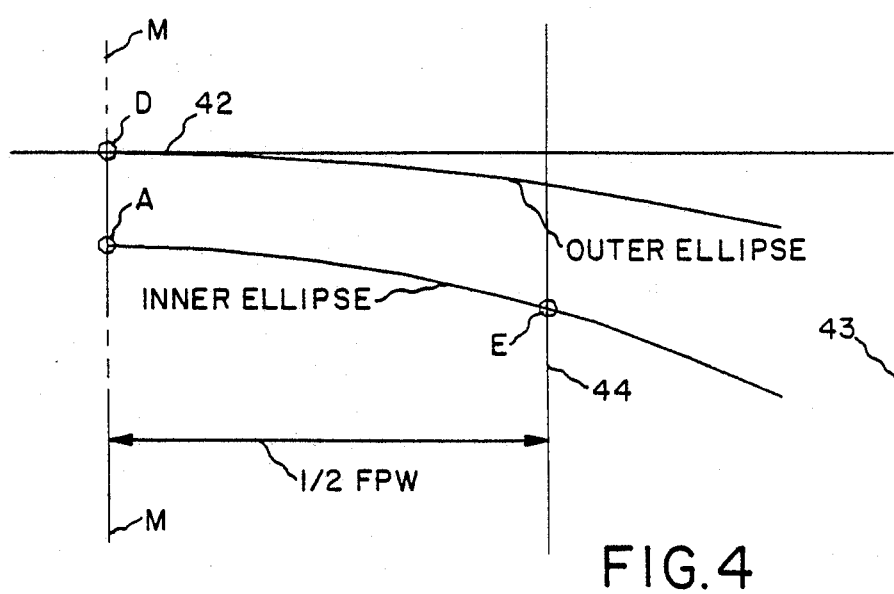

(g) Generate an ellipse indicated an "INNER ELLIPSE" in FIG. 4, which is an enlarged view of the upper right-hand portion of FIG. 3, by using point C as the center of the ellipse and point B as a focus of the ellipse, said ellipse having a major diameter equal to two times the distance REL between points A and B, and having a minor diameter equal to two times the distance DELY between points A and C, using a rotation of zero.

(h) Generate a second ellipse labelled as "OUTER ELLIPSE" in FIG. 4, this ellipse having the same foci as the INNER ELLIPSE, but being offset to be tangent to line 42 at the centerplane M—M at point D (point D is located at the centerplane of the tire at the maximum outside molded diameter of the tire).

(i) Determine the width of a footprint of the tire according to the invention, for use on an H-type rim. The first step in determining the footprint width is to determine the desired area of the footprint when the tire is mounted upon the specified H-type rim, inflated to the manufacturer's recommended inflation pressure and subjected to the rated load for that inflation pressure.

The preferable way of determining the footprint area is to measure the footprint area of the bias ply tire which the radial ply tire is intended to replace. However, the desired footprint area may also be estimated using the equation:

$$\text{footprint area} = \frac{\text{load}}{\text{inflation pressure}}$$

The next step in determining the footprint width is to solve the following equation for x:

footprint area = $2.2X^2$

The next step in determining the desired footprint width is to solve the following equation using the result of the preceding computation:

footprint width = $1.1X$

The designer should bear in mind that the ratio of footprint width to footprint length should be in the range of 0.45 to 0.65.

(j) Draw as shown in FIG. 4 a line 44 that is parallel to the centerplane M—M and disposed away from the centerplane at a distance (½FPW) equal to one-half of the footprint width as determined in step (i).

Figure 5:
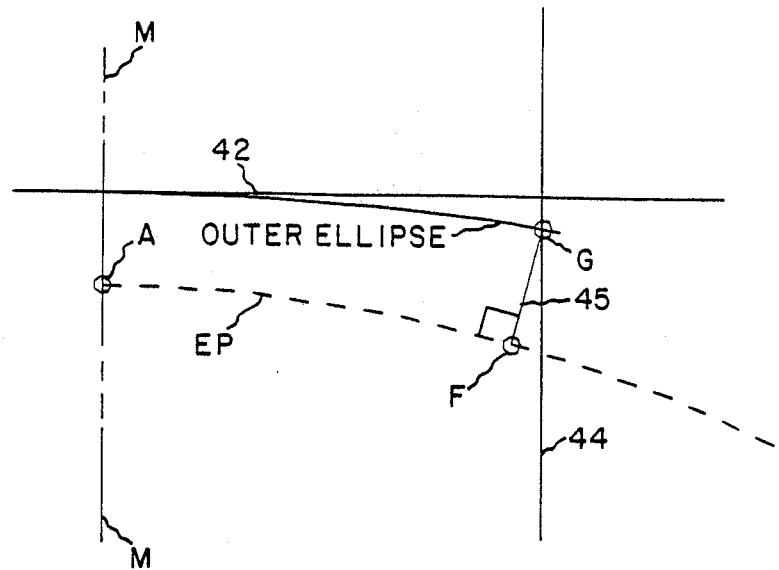

(k) Locate point E in FIG. 4 at the intersection of the INNER ELLIPSE and line 44, then determine an equilibrium profile EP as shown in FIG. 5 for the radial ply carcass that the designer wishes to use in the tire. The equilibrium profile EP may be determined by any of the well known equations for determining such a profile. Such equations are published for example in *MATHEMATICS UNDERLYING THE DESIGN OF PNEUMATIC TIRES*, by John F. Purdy, published by The Goodyear Tire & Rubber Company, copyrighted 1963. Equations for generating the equilibrium profile EP are also known from U.S. Pat. No. 3,757,844, the equations from this patent being set forth below for the convenience of a tire designer.

$$\cos \psi_1 = R_1^2 - R_e^2 R_s^2 - R_e^2$$

$$\cos \psi_2 = R_2^2 - R_e^2 R_s^2 - R_e^2$$

and $$S = \int_{R_1}^{R^2} \frac{(R_s^2 - R_e^2)dR}{\sqrt{(R_s^2 - R_e^2)^2 - (R^2 - R_e^2)^2}}$$

$R_1$ being the radius of the tire at the points where the carcass reinforcement and the tread reinforcement meet.

$\psi_1$ being the angle between the carcass reinforcement and the axis of the tire at the points where the carcass reinforcement and the tread reinforcement meet.

$R_s$ being the maximum radius of the carcass reinforcement.

$R_e$ being the radius of the points of the carcass farthest from the centerplane of the tire.

$R_2$ being the radius of the tire at the points where the carcass reinforcement meets the beads.

$\psi_2$ being the angle between the carcass reinforcement and the axis of the tire at the point where the carcass meets the beads.

S being the length of the cords between the points where the carcass reinforcement meets the tread reinforcement and the points where the carcass reinforcement meets the beads.

If, for example, a designer chooses to use the equilibrium equations as they are set forth in U.S. Pat. No. 3,757,844 then:

1. The approximate radius of the portion of the INNER ELLIPSE between points A and E may be used for the value of $R_1$.
2. The distance from the axis of the rotation to point A may be used for $R_s$.
3. The distance from the axis of rotation to point B may be used for $R_e$.
4. Other parameters as required for the bead in the equations may be determined from the drawings.

Figure 6:
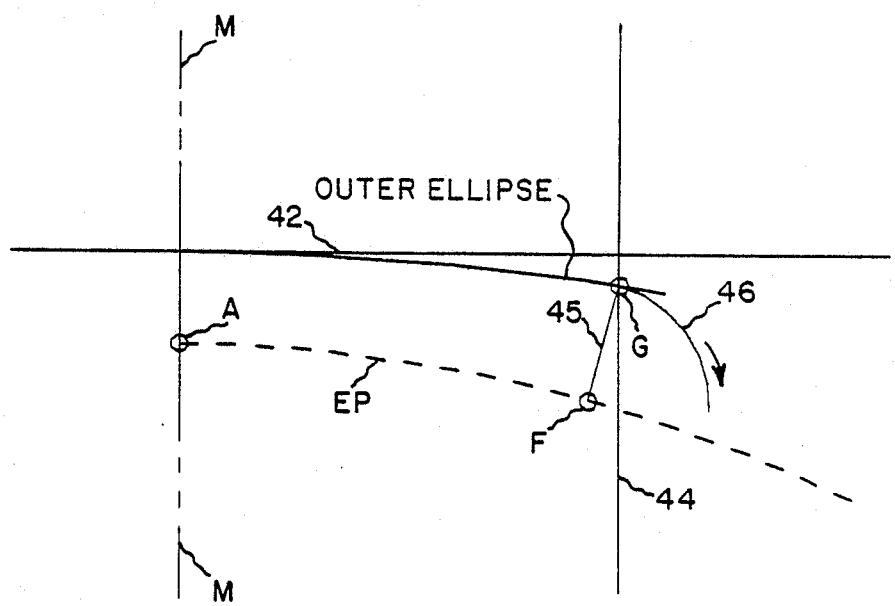

(l) With reference to FIG. 6, which shows the equilibrium profile EP, and in which the INNER ELLIPSE has been deleted, locate point G at the intersection of the OUTER ELLIPSE and line 44, then draw a line 45 which is normal to the OUTER ELLIPSE at point G, and locate point F at the intersection of the equilibrium profile EP and line 45.

(m) With reference to FIG. 6, strike an arc 46 having its center located at point F and a radius FG and extending clockwise from point G towards the equilibrium profile EP.

Figure 7:
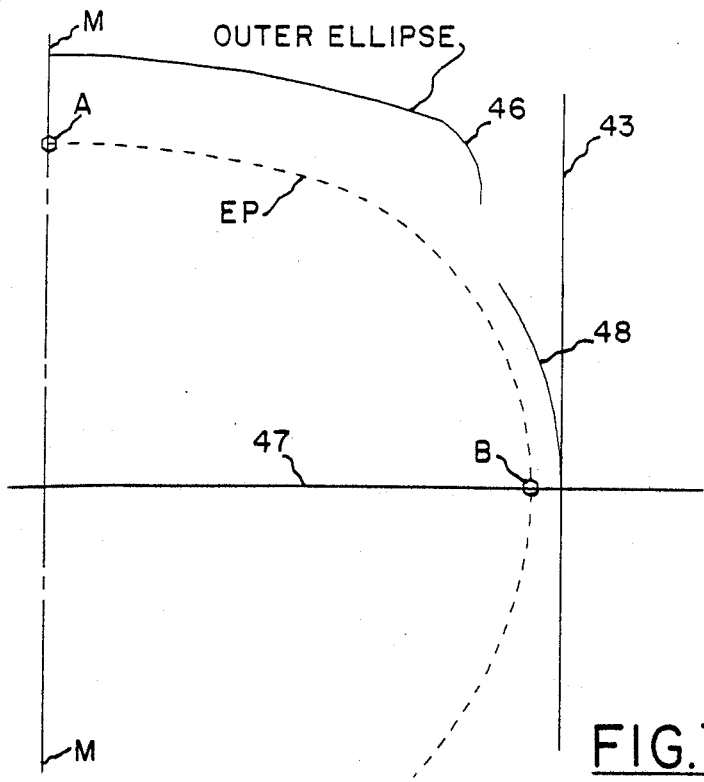

(n) As shown in FIG. 7, draw a reference line 47 parallel to the axis of rotation and passing through point B, then draw a line 48 parallel to the equilibrium profile EP starting at the intersection of reference line 47 and line 43 (maximum molded section width).

Figure 8:
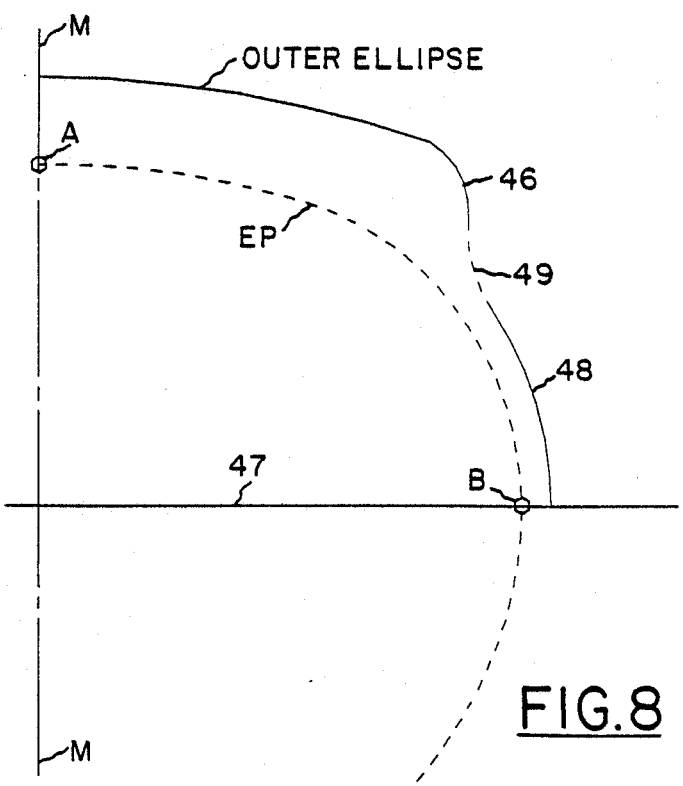

(o) As shown in FIG. 8, draw a line 49 which is a smooth curve blending the arc 46 into line 48 (note that the portion of the outer profile of the molded tire which is radially outward of the maximum cross-sectional width is now defined by portions of the OUTER ELLIPSE the arc 46, line 48, and blending line 49).

Figure 9:
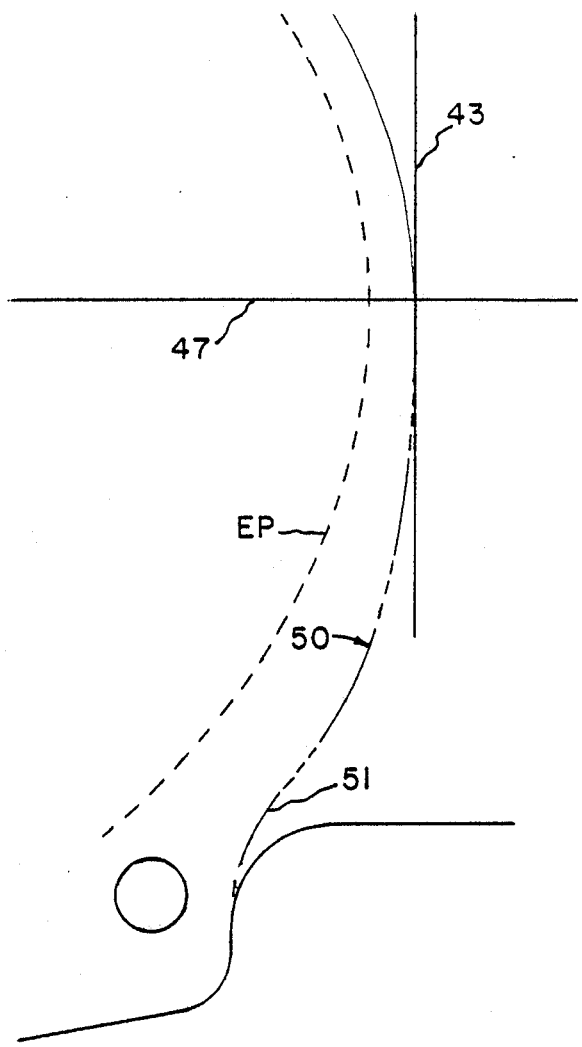

(p) As illustrated by way of example only in FIG. 9, the portion of the outer surface of the tire sidewall 50 which is disposed radially inward of the maximum cross-sectional width of the tire may be determined by a designer in accordance with good engineering practices. It is important that the radially innermost portion 51 of the sidewall does not rest directly upon the rim flange when the tire is mounted upon an H-type rim and inflated but not subjected to load.

While a certain method of designing a tire according to the invention has been shown and described, it will be apparent to those skilled in the art that various changes and modifications may be made in this method in order to design a tire and rim combination in accordance with the invention.

We claim:

1. A radial ply aircraft tire mounted upon an H-type rim as defined by The Tire and Rim Association, Incorporated, characterized by the ratio of the axial distance between the flanges of the rim to the maximum cross-sectional width of the tire being in the range of 0.7 to 0.85 when the tire is inflated to its specified inflation pressure as designated by the tire manufacturer but not subjected to any load, said tire having a carcass ply which is anchored about a pair of beads such that a line which is tangent to the carcass ply and passes through the center of a bead is inclined at an angle of greater than 60° with respect to the tire's axis of rotation, the axial distance between said flanges being substantially the same as the axial distance between the axially outermost extents of said beads, and when said combination is subjected to the rated load for said specified inflation pressure as designated by the tire manufacturer, the tire has a static footprint such that the ratio of the maximum axial width of the footprint to the maximum length of the footprint is in the range of 0.45 to 0.65.

2. A tire and rim combination as described in claim 1 further characterized by the ratio of the maximum axial width of the footprint to the maximum length of the footprint being in the range of 0.5 to 0.6.

3. A tire and rim combination as described in claim 1 further characterized by the ratio of the axial distance between the flanges of the rim to the maximum cross-sectional width of the tire being in the range of 0.78 to 0.82.

4. A tire and rim combination as described in claim 3 further characterized by the ratio of the maximum axial width of the footprint to the maximum length of the footprint being in the range of 0.5 to 0.6.

5. A tire and rim combination as described in any one of claims 1 to 4 further characterized by said carcass ply comprising cords of an aramid material.

6. A tire and rim combination as described in any one of claims 1 to 4 further characterized by the tire having one or more belt plies comprising cords of an aramid material.

7. A tire and rim combination as described in any one of claims 1 to 4 further characterized by the tire having one or more belt plies comprising cords of an aramid material and said carcass ply comprising cords of an aramid material.

* * * * *